(12) United States Patent
Wardle et al.

(10) Patent No.: US 9,201,591 B1
(45) Date of Patent: Dec. 1, 2015

(54) AUTOMATED COVERAGE MONITORING OF MOBILE APPLICATIONS

(71) Applicant: SYNACK, INC., Redwood City, CA (US)

(72) Inventors: Patrick Wardle, Maui, HI (US); Mark G. Kuhr, Los Altos, CA (US)

(73) Assignee: Synack, Inc., Redwood City, CA (US)

( * ) Notice: Subject to any disclaimer, the term of this patent is extended or adjusted under 35 U.S.C. 154(b) by 0 days.

(21) Appl. No.: 14/715,905

(22) Filed: May 19, 2015

(51) Int. Cl.
*G06F 3/0488* (2013.01)
*G06K 9/00* (2006.01)
*G06F 3/01* (2006.01)

(52) U.S. Cl.
CPC .............. *G06F 3/0488* (2013.01); *G06F 3/017* (2013.01); *G06K 9/00355* (2013.01)

(58) Field of Classification Search
CPC ........................... G06F 3/0488; G06F 3/04883
USPC ......................................................... 345/173
See application file for complete search history.

(56) References Cited

U.S. PATENT DOCUMENTS

| | | | | |
|---|---|---|---|---|
| 2014/0068494 | A1* | 3/2014 | Petersen et al. | 715/778 |
| 2014/0132571 | A1* | 5/2014 | Zeng et al. | 345/178 |
| 2015/0082255 | A1* | 3/2015 | DeVries et al. | 715/863 |

* cited by examiner

*Primary Examiner* — Ariel Balaoing
(74) *Attorney, Agent, or Firm* — Hickman Palermo Becker Bingham LLP

(57) ABSTRACT

Embedded devices, such as smart phones, can execute an application for performing a set of discrete tasks. To evaluate applications for security vulnerabilities, a coverage monitoring system generates a directed graph of the application running on the embedded device. The directed graph is generated by logging gestures submitted by a user of the application and logging one or more actions taken by the application in response to the gesture. The gesture can include a click, a text input, or a more complex gesture. In response to the gesture, the application can change a current view, or screen, or can transition to a different view. The coverage monitoring system logs the gestures and logs a screenshot or other data about the response of the application. The logged data is used to generate the directed graph which can be accessed by application analysts and analyzed for security vulnerabilities.

20 Claims, 7 Drawing Sheets

AUTOMATED COVERAGE MONITORING OF MOBILE APPLICATIONS

FIELD OF THE DISCLOSURE

The present disclosure generally relates to security techniques applicable to embedded computer systems, and relates more specifically to improved techniques for evaluating and testing applications running on embedded computer systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Embedded computing devices, such as smart phones and tablet computers, may be used to perform one or more specialized and/or dedicated functions. An embedded device may include components not normally provided on typical desktop computers, such as cellular radio modems, motion sensors, cameras, lights, global positioning system receivers, and other inputs. Embedded devices often include specialized hardware configurations. For example, a smart phone may include a processor that is optimized to minimize power consumption, which may allow the phone to operate longer before needing to be recharged. Embedded devices that have a built-in display may include specialized hardware configured to provide a higher refresh rate for the particular built-in display.

Applications that run on embedded devices may be specialized based on the target embedded device(s). For example, source code and content for a particular application or project may be compiled and packaged to produce a first specialized application configured to be executed on a first embedded device with a first set of hardware. The same source code and content may be compiled and packaged again to produce a second, different specialized application configured to be executed on a second embedded device with a second, different set of hardware.

Many users carry at least one embedded device to communicate with customers, schedule meetings, pay bills, trade stocks, track expenses, book flights and hotels, read articles, view multimedia content, listen to music, play games, purchase goods and services, track diet and fitness, browse web sites, draft documents, make phone calls, and much more using many different applications. As a result, users frequently input, download, and store sensitive information, such as usernames, passwords, social security numbers, home or work addresses, medical information, customer information, documents, contact information, photos, and other private and sensitive data.

Determining the vulnerabilities of an application or project is useful to protect application users and developers. However, determining what vulnerabilities an application has may be difficult and time consuming. Furthermore, a single application or project may be compiled into multiple specialized applications, each of which may have different vulnerabilities.

SUMMARY

The appended claims may serve as a summary of the invention.

Figure 1:
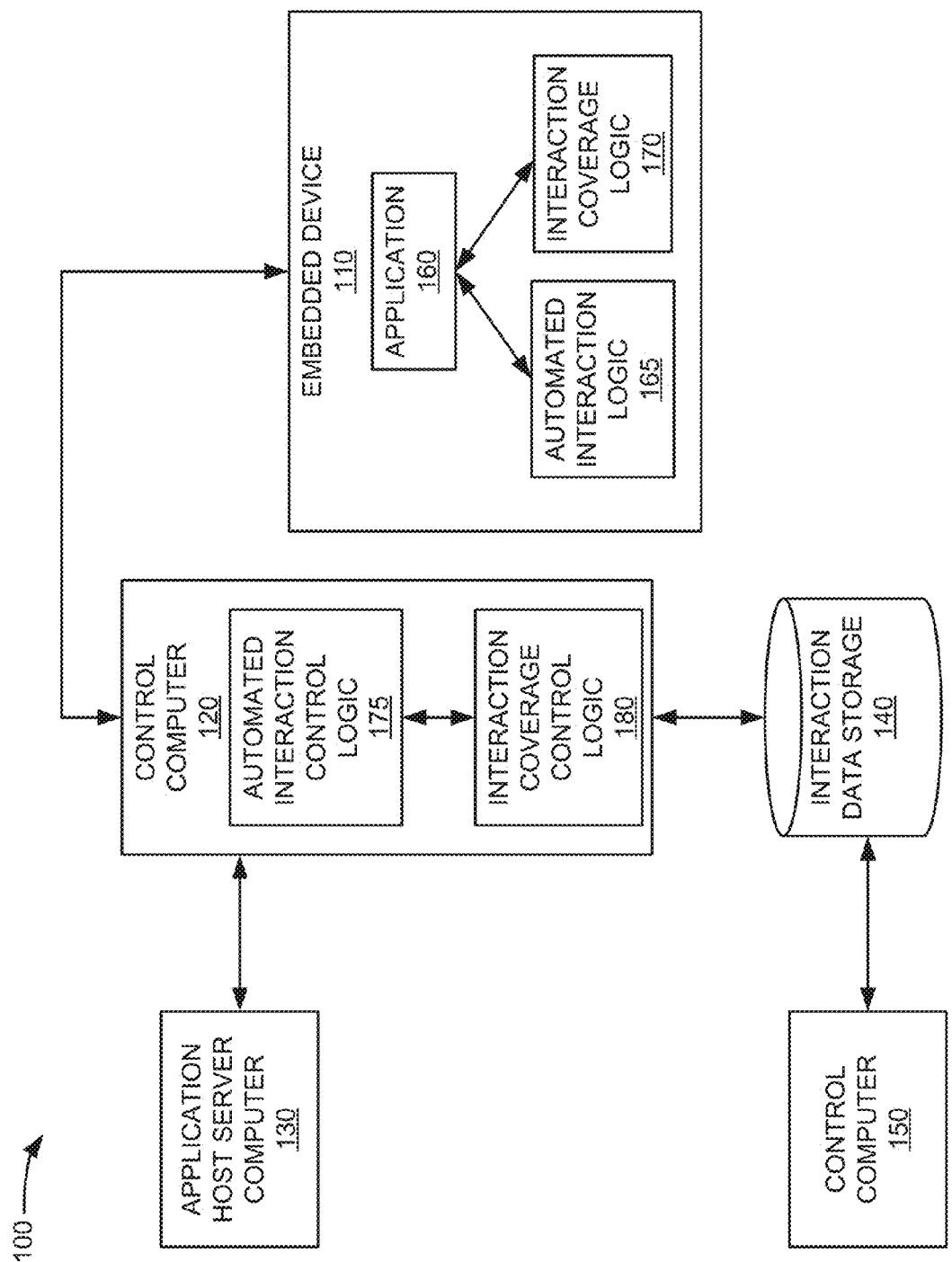
FIG. 1 illustrates a computer system that is programmed or configured for monitoring and testing one or more specialized applications for one or more embedded devices in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Monitoring and Interacting with Applications on Embedded Devices
  3.0 Example Computer System Topology
    3.1 Application Host Server Computer
    3.2 Embedded Device
    3.3 Control Computer
    3.4 Storage and Memory
  4.0 Monitoring Process Overview
    4.1 Downloading a Specialized Application
    4.2 Configuring the Application to Load and Execute Interaction Coverage Logic
    4.3 Executing the Application
    4.4 Logging UI View
    4.5 Gesture Detection
    4.6 Gesture Logging
    4.7 End Condition
    4.8 Generating a Directed Graph
  5.0 Interaction Process Overview
    5.1 Run Application
    5.2 Enumeration and Classification of Subviews
    5.3 Handling of Remote Views
    5.4 Activation of UI Elements
      5.4.1 Selection of a Presented UI Element
      5.4.2 Simulation of User Inputs
      5.4.3 Automated Interaction with Subviews
  6.0 Implementation Mechanisms—Hardware Overview
  7.0 Other Aspects of Disclosure

1.0 GENERAL OVERVIEW

In one embodiment, a data processing system comprises one or more processors; one or more non-transitory computer-readable media storing instructions stored which, when executed, cause the one or more processors to perform: establishing a monitoring connection to an embedded device over a network and causing the embedded device to concurrently execute a gesture recognizer and an executable application having a plurality of views; using the gesture recognizer executed by the embedded device, detecting a first gesture in a first view of the plurality of views that has been received via a touchscreen interface of the embedded device; using the embedded device, creating and storing a log record that identifies the first gesture in the first view and a first action that was performed by the application in response to the first gesture; using the embedded device, determining that the first action caused the application to provide a second view of the plurality of views; using the embedded device, creating and storing a second log record that identifies the second view of the plurality of views; using the gesture recognizer executed by the embedded device, detecting a second gesture in the second view of the plurality of views that was received via the touchscreen interface of the embedded device; using the embedded device, logging the second gesture in the second view and a second action performed by the application in response to the second gesture; using the embedded device, generating a directed graph representing an execution flow of the application, wherein the directed graph comprises: nodes representing the first view, the first gesture, the second view, and the second gesture; and edges representing that the first gesture in the first view causes the application to transition from the first view to the second view.

In another embodiment, a data processing method comprises establishing a monitoring connection to an embedded device over a network and causing the embedded device to concurrently execute a gesture recognizer and an executable application having a plurality of views; using the gesture recognizer executed by the embedded device, detecting a first gesture in a first view of the plurality of views that has been received via a touchscreen interface of the embedded device; using the embedded device, creating and storing a log record that identifies the first gesture in the first view and a first action that was performed by the application in response to the first gesture; using the embedded device, determining that the first action caused the application to provide a second view of the plurality of views; using the embedded device, creating and storing a second log record that identifies the second view of the plurality of views; using the gesture recognizer executed by the embedded device, detecting a second gesture in the second view of the plurality of views that was received via the touchscreen interface of the embedded device; using the embedded device, logging the second gesture in the second view and a second action performed by the application in response to the second gesture; using the embedded device, generating a directed graph representing an execution flow of the application, wherein the directed graph comprises: nodes representing the first view, the first gesture, the second view, and the second gesture; and edges representing that the first gesture in the first view causes the application to transition from the first view to the second view.

Other features and aspects of other embodiments will become apparent from the disclosure as a whole.

2.0 MONITORING AND INTERACTING WITH APPLICATIONS ON EMBEDDED DEVICES

Examples of embedded devices are smart phones and tablet computers. Attackers may target a specific specialized application on an embedded device to access sensitive information stored on, or entered into, the embedded device. For example, an attacker may employ a man-in-the-middle attack to collect login information entered by a user into a vulnerable specialized banking application on her phone and sent to her bank. The attacker may then access the user's bank account and transfer funds. An attacker may look for usernames and passwords saved in an unencrypted file generated by a specialized application. An attacker may inject code downloaded by a specialized application to cause the specialized application to perform one or more operations that the user did not intend, such as delete data, send data to the attacker, and impersonate the user.

Attackers may target a specific specialized application on an embedded device to disrupt services, attack the application's developer(s), and users on other devices. For example, an application developer may create a specialized application that sends data to a particular web server identified by an unprotected Internet Protocol ("IP") address or Uniform Resource Locator ("URL"). An attacker may extract the unprotected URL from the specialized application, and perform a denial of service attack on the web server. Also for example, an application developer may create a specialized application that stores data in, or receives data from, an online database through an Application Program Interface ("API"). An attacker may analyze the specialized application to find unprotected API credentials used to send data to, and retrieve data from, the online database. The attacker may use the API credentials to retrieve private data from the online database for one or more users and/or store bogus data in the online database.

Detecting vulnerabilities and errors in an application or project is useful to protect application users and developers. However, detecting what vulnerabilities an application has may be difficult and time consuming. Furthermore, a single application or project may be compiled into multiple specialized applications, each of which may have different vulnerabilities.

To make the detection of vulnerabilities in applications easier and less time-consuming, in various embodiments, systems for monitoring interactions with an application and for automatically interacting with an application installed on an embedded device are provided. By monitoring interactions with the applications, the tester has access to a more robust data set describing the application under test. By automating the interactions with the application, the monitoring application can obtain the dataset faster and more efficiently than if a human tester manually interacts with the application that is monitored. Embodiments also permit computers and/or testers to determine whether all features and functions of an application have been adequately tested, by examining output of a monitoring system to determine if test protocols have activated or interacted with all features and functions of the application.

3.0 EXAMPLE COMPUTER SYSTEM TOPOLOGY

FIG. 1 illustrates a computer system that is configured or programmed for detecting vulnerabilities and errors in one or more specialized applications for one or more embedded devices in an example embodiment. An application, logic, and/or module may be "specialized," in the sense of this disclosure, if it is configured to be executed on an embedded device with a particular hardware and/or software configuration. In FIG. 1, a computer system 100 comprises an embedded device 110, control computer 120, application host server computer 130, and interaction data storage 140, which are communicatively coupled directly or indirectly using one or more computer networks. The networks may comprise one or more local networks, wide area networks, and/or internetworks or a combination, using any of wired, wireless, terrestrial and/or satellite links.

A computer as provided herein may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

While each of the components listed above is illustrated as if running on a separate, remote computer from each other, one or more of the components listed above may be part of and/or executed on the same computer. For example, control computer 120, application host server computer 130, and interaction data storage 140 may be executed on the same computer, local area, and/or wide area network.

3.1 Application Host Server Computer

Application host server computer 130 may generate and/or store one or more specialized applications, from which one or more computers and/or devices may download applications from. For example, application host server computer 130 may receive a request for a particular application from a first embedded device, for example, embedded device 110, using a particular user's credentials. In response, application host server computer 130 may send a specialized version of the application to the first embedded device. The specialized version may be a particular version of the application that is configured to be executed on the first embedded device. The specialized version of the application, or one or more portions the specialized version, may be encrypted based on the particular user's credentials. Accordingly, computers that do not have the particular user's credentials may be prevented from decrypting and/or using the specialized version.

3.2 Embedded Device

Embedded device 110 broadly represents one or more embedded devices, each of which may have different hardware and/or software configurations. Each embedded device typically comprises at least one or more processors, memory and program logic, and I/O devices such as a touch-sensitive display or screen. For example, a first embedded device 110 may be a smart phone and comprise a first set of hardware, and another embedded device may be a tablet and comprise a second, different set of hardware. Additionally or alternatively, the embedded device 110 may comprise a first operating system and the other embedded device may comprise a second, different operating system. Embedded device 110 may be communicatively coupled to control computer 120 wirelessly and/or through one or more cables and/or networks. Examples include ANDROID smart phones or tablet computers, APPLE IOS-based smartphones or tablet computers, laptop computers and the like.

Embedded device 110 may comprise application 160, which may be a specialized version of a particular application that has been downloaded from application host server computer 130, which embedded device 110 may execute. "Executing" an application, process, and/or any other module or logic may include launching, loading, spawning, interpreting, and/or executing the application, process, and/or any other module or logic. Another embedded device may comprise another application, which may be a different specialized version of the same particular application downloaded from an application host server computer, such as different application host server computer 130.

Additionally or alternatively, a specialized application may be a "universal application", which includes multiple executable modules and/or files. Each of the multiple executable modules and/or files may be configured to be executed by one or more particular hardware and/or software configurations. When the embedded device executes the application, the embedded device, and/or logic on the embedded device, may determine which modules and/or files are configured for that particular embedded device, and execute those modules and/or files.

Embedded device 110 comprises automated interaction logic 165. Automated interaction logic 165 may be specialized hardware and/or software for embedded device 110 and/or application 160 that is programmed or configured to facilitate automated interaction with the device in the manner further described herein. Throughout this disclosure, programming the functions described herein may be implemented using any of several program languages or program development environments such as JAVA, C, C++, OBJECTIVE-C, VISUAL BASIC, or others and all algorithms, flow diagrams and other functional descriptions given herein are intended as guidance about how to program the algorithms, flows or functions in any of the foregoing languages or environments based upon knowledge of those languages or environments and the functional information given herein. Automated interaction logic 165 may be executed by embedded device 110 and/or an application running on embedded device 110, such as an operating system or application 160. For example, automated interaction logic 165 may be a precompiled, shared, and/or dynamically linked library specialized for the hardware and/or software configuration of embedded device 110. Application 160 may, at run-time, load automated interaction logic 165 and cause one or more methods in automated interaction logic 165 to be executed.

Automated interaction logic 165 may be executed as if part of application 160. Automated interaction logic 165 may be executed in parallel with application 160. Automated interaction logic 165 may have access to the memory, hardware, modules, and/or other resources on embedded device 110 and/or in application 160, as if part of application 160. Automated interaction logic 165 may execute in parallel with application 160 on embedded device 110. Automated interaction logic 165 may be communicatively coupled with control computer 120 and/or automated interaction control logic 175. Automated interaction logic 165 may be created by a first entity, such as a testing facility, and application 160 may be created by a second, different entity, such as an application developer.

Embedded device 110 comprises interaction coverage logic 170. Interaction coverage logic 170 may be specialized hardware and/or software for embedded device 110 and/or application 160 that is programmed or configured to provide the interaction coverage functions that are more fully described herein in other sections. Interaction coverage logic 170 may be executed by embedded device 110 and/or an application running on embedded device 110, such as an operating system or application 160. For example, interaction coverage logic 170 may be a pre-compiled, shared, and/or dynamically linked library specialized for the hardware and/or software configuration of embedded device 110. Application 160 may, at run-time, load interaction coverage logic 170 and cause one or more methods in interaction coverage logic 170 to be executed.

Interaction coverage logic 170 may be executed as if part of application 160. Interaction coverage logic 170 may be executed in parallel with application 160. Interaction coverage logic 170 may have access to the memory, hardware, modules, and/or other resources on embedded device 110 and/or in application 160, as if part of application 160. Interaction coverage logic 170 may execute in parallel with application 160 and automated interaction logic 165 on embedded device 110. Interaction coverage logic 170 may be communicatively coupled with control computer 120 and/or interaction coverage control logic 180. Interaction coverage logic 170 may be created by a first entity, such as a testing facility, and application 160 may be created by a second, different entity, such as an application developer.

3.3 Control Computer

Control computer 120 may be a computer that is communicatively coupled to embedded device 110, application host server computer 130, and interaction data storage 140. Control computer 120 may store and/or receive data from each device directly or through one or more other devices.

Control computer 120 comprises automated interaction control logic 175 and interaction coverage control logic 180, which may coordinate interaction with and monitoring of a specialized application on an embedded device, automated interaction logic and interaction coverage logic on the same embedded device, and one or more other computers, logic, or server computers. Interaction control logic 175 and interaction coverage control logic 180 may store one or more applications and/or one or more specialized interaction modules and one or more specialized coverage modules and/or logic on an embedded device. For example, interaction control logic 175 and interaction coverage control logic 180 may store application 160, automated interaction logic 165, and interaction coverage logic 170 in storage included in, and/or communicatively coupled to, embedded device 110. The interaction control logic 175 and interaction coverage control logic 180 may store one or more applications, metadata derived from the one or more applications, and/or data describing one or more interactions, views, or user interface elements detected in the one or more applications in interaction data storage 140.

Figure 2:
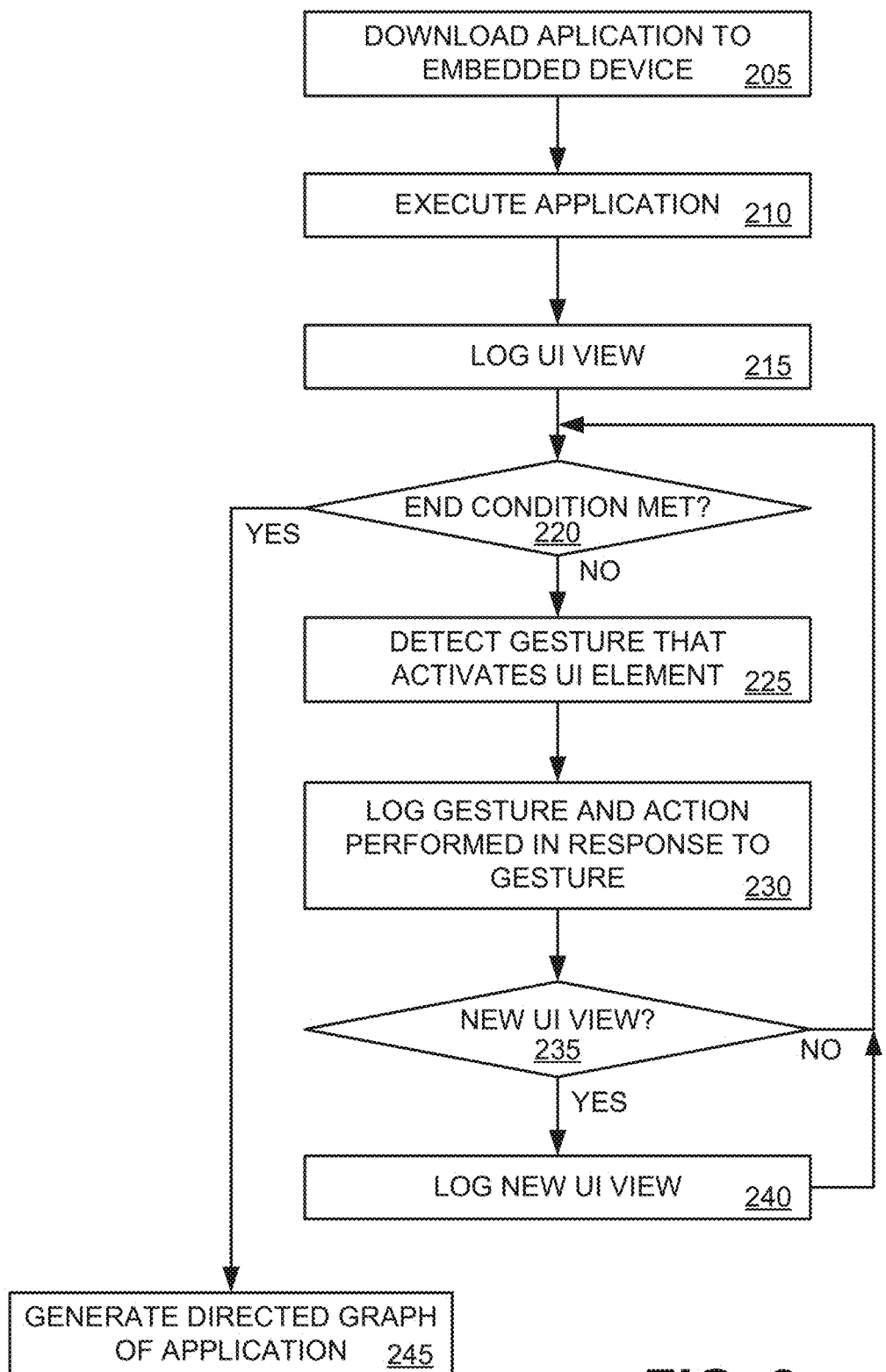
FIG. 2 illustrates a process of monitoring specialized applications to record views within the specialized applications in an example embodiment.
Figure 3:
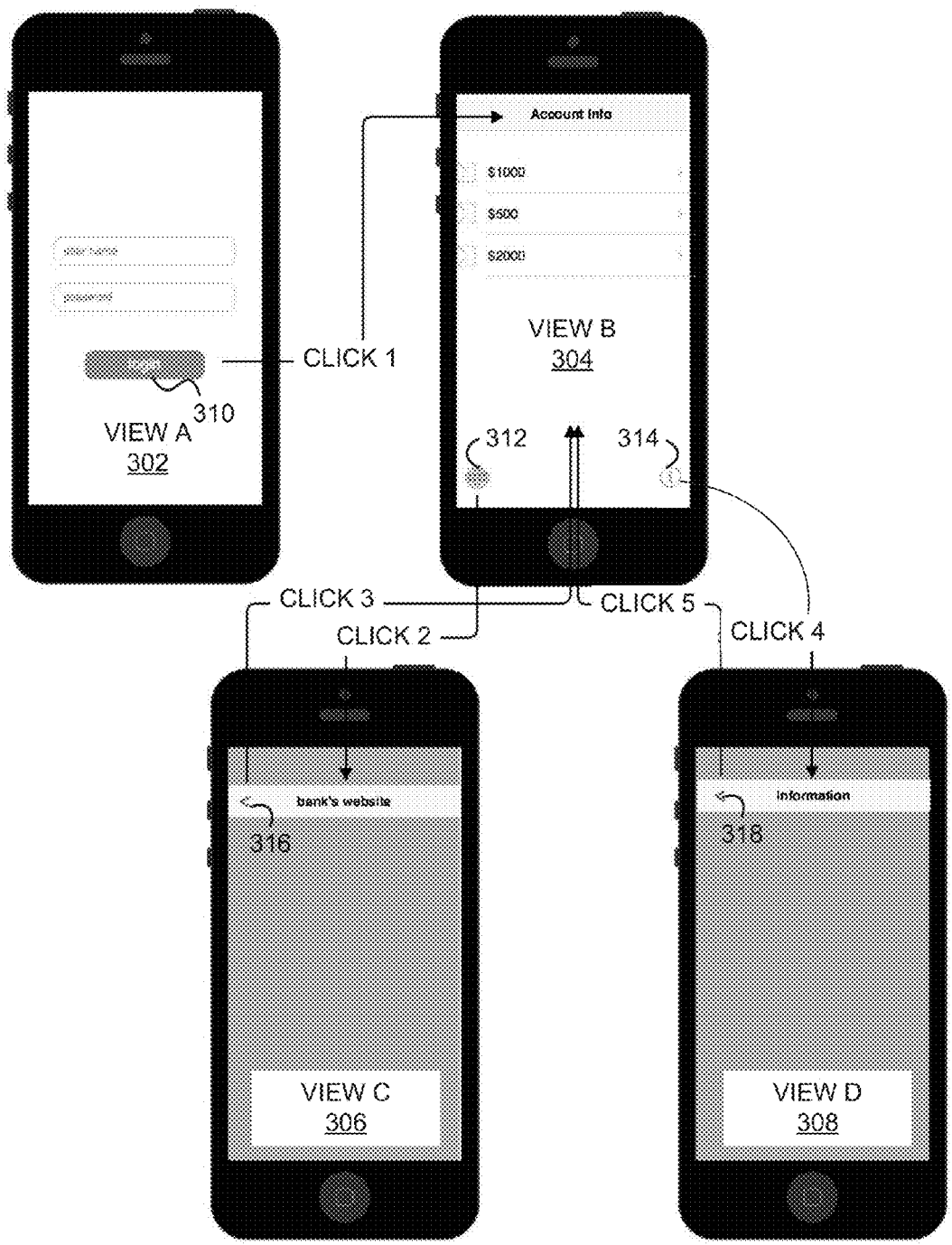
FIG. 3 depicts example of views within a specialized application in an example embodiments.
Figure 4:
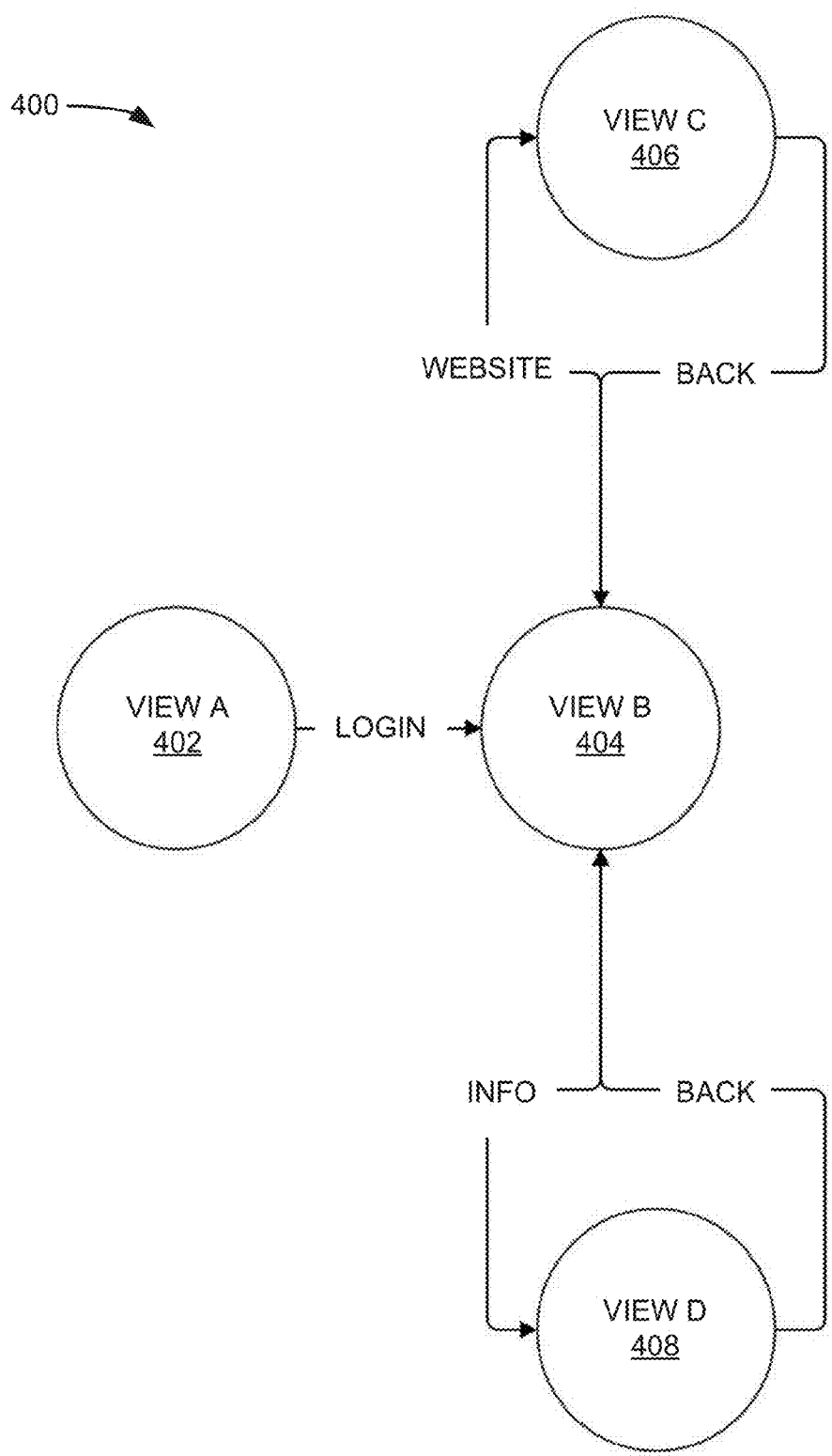
FIG. 4 depicts an example of a directed graph of the specialized application in the example embodiment of FIG. 3.

In an embodiment, each of the functional units of control computer 120 may be implemented using any of the techniques further described herein in connection with FIG. 2, FIG. 3, FIG. 4; for example, the control computer 120 may comprise a general-purpose computer configured or programmed with one or more stored programs which when executed cause performing the functions described herein for the intermediary computer, or a special-purpose computer with digital logic that is configured or programmed to execute the functions, or digital logic that is used in other computing devices. Because of the configuration and programming that is described, it should be understood that the control computer is not intended as a non-programmed, generic general-purpose computer. While the figures include lines that indicate various devices and/or modules being communicatively coupled, each of the computers, devices, modules, storage, and configurations may be communicatively coupled with each other.

The control computer 120 broadly represents any computer that may be used to retrieve and/or store data from interaction data storage 140. Control computer 120 may be programmed to retrieve and/or store one or more encrypted applications, decrypted applications, and/or data related to, and/or associated with, the one or more applications. For example, control computer 120 may retrieve an encrypted copy of an application, a decrypted copy of the application, and/or metadata describing one or more objects and/or interfaces defined in the application from interaction data storage 140. An administrator or other user may review each of the items downloaded for vulnerabilities and errors and store descriptions of those vulnerabilities and/or errors in interaction data storage 140, and may review and/or validate each of the vulnerabilities and errors and store descriptions of those vulnerabilities and/or errors in interaction data storage 140.

3.4 Storage and Memory

A data store and/or storage may be one or more databases, configuration files, file systems, computers, and/or data structures that store data in volatile and/or non-volatile memory. Storage, data stores, and/or memory may mean any non-volatile and/or volatile memory components capable of storing data, including electronic digital data storage devices. Interaction data storage 140 may be a data store that stores one or more encrypted applications, decrypted applications, and/or data related to, and/or associated with, the one or more encrypted and/or decrypted applications.

4.0 MONITORING PROCESS OVERVIEW

The control computer 120 may be configured or programmed to download and store a specialized application on a compatible embedded device 110. If an application is encrypted, then the control computer may decrypt the application and save a decrypted version in a data store. The control computer 120 may extract metadata from the decrypted application and store the metadata in the metadata in the data store. The control computer may monitor interactions with the specialized application and/or automatically interact with the specialized application. The control computer may store descriptions of the interactions and resulting actions taken by the specialized application in the data store.

One or more consultants may review, verify, and/or supplement the encrypted version of the application, the decrypted version of the application, the metadata extracted, and/or interactions and user flows found. The control computer 120 and/or a consultant may notify the application's developer(s) and/or vendor(s) of the interactions monitored or performed or the actions taken by the application in responses to those interactions. As a result, embodiments provide numerous benefits and improvements over the general idea of detecting vulnerabilities in a computer. For example, embodiments provide monitoring and simulating user interaction with one or more specialized applications on one or more embedded computing devices.

FIG. 2 illustrates a process for downloading and monitoring specialized applications to record data about the specialized application that can later be used to detect vulnerabilities in the specialized application in an example embodiment. In an embodiment, an embedded device may have one or more safeguards in place to prevent users from performing one or more of the steps discussed herein. A user may perform one or more steps to get around, skirt, and/or remove such safeguards. Getting around and/or removing safeguards imposed by an embedded device is commonly referred to as "jail breaking", "rooting", and/or "privilege escalation". Although a user has skirted and/or removed one or more safeguards, the embedded device may still be communicatively coupled to control computer 120, application host server computer 130, and/or any other computer.

4.1 Downloading a Specialized Application

In step 205, a control computer downloads an application to a first storage coupled to a first device. For example, interaction coverage logic 170 may request a specialized application from application host server computer 130 for embedded device 110. The request may include one or more identifiers that identify embedded device 110. The request may include one or more user credentials associated with the embedded device 110. The request may include one or more identifiers that identify one or more hardware configurations, one or more software configurations, and/or any other data needed to generate, and/or select, a specialized version of an application for embedded device 110.

In response to the request from interaction coverage logic 170, application host server computer 130 may encrypt application 160 and send application 160 to interaction coverage logic 170. Interaction coverage logic 170 may store application 160 on memory included in, and/or coupled to, embedded device 110.

Additionally or alternatively, interaction coverage logic 170 may cause embedded device 110 to request specialized application 160 from application host server computer 130. In response, embedded device 110 may receive application 160 from application host server computer 130, and store application 160 on memory included in, and/or coupled to, embedded device 110.

4.2 Configuring the Application to Load and Execute Interaction Coverage Logic

As part of step 205, in one embodiment, the control computer 120 configures the application 160 to load and execute interaction coverage logic 170 when the application is executed. There are many ways to configure an application to load and execute interaction coverage logic at run-time. However, for purposes of illustrating a clear example, assume embedded device 110 has a remote command-line interface from which interaction coverage control logic 180 may modify and/or set system configurations, execute applications, read data from files, write data from files, interface with the operating system, and/or perform, and/or cause embedded device 110 to perform, any other tasks or functions embedded device 110 may be configured to perform. Also assume that application 160 is configured to load one or more libraries identified in a particular environment variable. Interaction coverage control logic 180 may copy interaction coverage logic 170 on embedded device 110. Interaction coverage logic 170 may configure embedded device 110 and/or application 160 to load interaction coverage logic 170 when application 160 is executed by setting an environment variable that references interaction coverage logic 170. Accordingly, when application 160 is executed, then interaction coverage logic 170 may be executed.

Additionally or alternatively, application 160 may be pre-configured to load one or more particular libraries when application 160 is executed. Interaction coverage control logic 180 may replace one of the one or more particular libraries with interaction coverage logic 170. Accordingly, when application 160 is executed, then interaction coverage logic 170 may be executed.

4.3 Executing the Application

In step 210, execution of the embedded application begins. For example, the control computer 130 begins executing the application at the embedded device 110. For example, interaction coverage control logic 180, through the remote command-line interface, may cause embedded device 110 to begin executing application 160. Accordingly, embedded device 110 may also begin executing interaction coverage logic 170.

4.4 Logging UI View

In step 215, the control computer and/or embedded device logs an initial user interface (UI) view of the application. As used herein, a UI view is a stored digital image representing a capture of one screen that has been generated by the application. The UI view may represent a web page that has a visually hidden but programmatically usable underlying structure, such as a document object model (DOM) tree. The UI view comprises one or more interactive UI elements via which the application 160 performs one or more actions, and that are defined in code such as HTML or Javascript. For example, in a banking application, the first UI view of the application can be a login view having text fields for a username and password, and a clickable submit button, each at a prescribed x-y coordinate of the view; these elements normally are defined in HTML code or Javascript that drives a browser to visually render the UI view with a particular form and appearance on a client computer display screen.

The UI elements can be implemented by the application 160 using one or more gesture recognizers. In an embodiment, gesture recognizers comprise logic, programs or other software elements that are programmed or configured to convert low-level event handling code into higher-level actions. The gesture recognizers may be programmatic objects that are attached to a view, which allows the view to respond to actions the way a control does. Gesture recognizers may be configured or programmed interpret touches or gestures detected using a touch screen interface to determine whether they correspond to a specific gesture, such as a swipe, pinch, or rotation.

In an embodiment, the UI view is logged by the interactive coverage logic 170, sent to the interaction control logic 180, and stored in the interaction data storage 140 in an electronically stored digital data record that identifies the view and comprises identifiers of the UI view elements and/or a bitmap image or other graphical image of the UI view. When logged, the view is assigned a view identifier and a timestamp indicating when the view was captured. Consequently, in the interaction data storage 140, every logged view may be uniquely identified and later inspected or compared to previously processed views.

In step 220, a determination is made as to whether an end condition is met indicating completed monitoring. This step is discussed below. In the intervening discussion, it is assumed that the end condition is not met.

4.5 Gesture Detection

In step 225, a gesture is detected on via a touch interface of the UI view. The gesture can be provided by a human operator or by automated interaction logic 165 to activate a UI element. The gesture can be a touch-down, touch-up, swipe, scroll, text character input, or a more complex gesture including any gesture that is recognized by a gesture recognizer. The detected gesture is recorded by the interaction coverage logic 170 as, for example in the case of touch up or touch down gestures (for example, a "click"), an x-y coordinate of the UI view. More complex gestures can be recorded as a dataset comprising values for beginning x-y coordinate(s), ending x-y coordinate(s), a number of intermediate x-y coordinates, and one or more timestamps associated with the x-y coordinates. For example, detecting a gesture may comprise detecting a series of gestures indicating scrolling down a table and then selecting one or more rows. The data associated with such a series of gestures may be detected based upon time bounds or pauses so that the system collects all touch data occurring within a specified period of time, say 3 seconds, and then determines whether the gestures occurred with respect to a single GUI widget or a set of GUI widgets that have a defined relationship as specified in stored metadata. Thus in the preceding example the system may store metadata specifying that a particular table comprises a plurality of rows and has a scroll bar, so that interaction with the scroll bar and any one or more of the rows within a defined time period is collected and recorded as a single gesture. In some instances, the gestures are stored such that they can be depicted at the computer 120 or 130 as graphical elements overlaid on the UI view.

4.6 Gesture Logging

In step 230, after the gesture is detected, as an example the application responds to the gesture by, for example, changing the UI view or providing a new UI view. To illustrate, in the banking application example above, when the "submit" UI element is activated, the login view may be changed to include a message to the user indicating an incorrect password was input. In instances where a correct password was provided, the login view is replaced with a new account view that provides an account summary.

In a step 235, the process determines whether the action of the step 230 comprises presentation of a new UI view. As used in this step, a new UI view is a view not previously logged.

In one embodiment, step 235 may comprise issuing one or more queries to the interaction data storage 140 to request titles of views matching a title of the current UI view. In an embodiment, each UI view typically is assigned a title by a developer of the application 160 and the title is carried in a text field associated with the UI view, so that the title can be displayed using the embedded device 110 in operation. If a match is found using the queries, then the current view was previously logged and is not a new view. If the view is previously logged, but is different from the view displayed to the user when the gesture was received, then the determination in step 235 is "No" or a logical equivalent.

However, in some cases, title values may be the same in multiple different views, such as successively displayed views. To avoid counting two different views having the same title as a single view, one or more characteristics of each view may be inventoried. For example, for each view, the characteristics may include a number of UI elements such as buttons or interactive or clickable widgets, the presence of one or more text fields, whether additional gestures are recognized on the UI view, a color scheme or image of the view, or the like. Each such inventory value, for a particular view, may be stored as part of a view data record that is logged at step 215 and used in view comparisons at step 235. An iterative or progressive comparison approach may be used. For example, in some embodiments, the titles of the views are compared first and, only if the titles match, then the numbers of UI elements included in each view are compared; only if the numbers of UI elements match, then the views are determined to be one and the same. If the number of elements does not match, the views are determined to be different views.

In step 240, if the view is determined to be a new view in step 235, the interaction coverage logic 170 logs the new view by capturing a screen shot of the view, the title of the view, one or more characteristics of the view (for example, the number of UI elements), and assigns a view identifier to the view.

4.7 End Condition

When the view is logged in step 240, or if the determination of in step 235 is that the view is not a new view, the process returns to step 220. In step 220, the interaction coverage logic 170 determines whether an end condition is met. The end condition can be met when a user manually exits the application, or, when the interaction is performed by the automated interaction logic 165, when the automated interaction logic 165 exits the application.

In some embodiments, the end condition can be evaluated by the interaction coverage logic 170 independently of user actions. The evaluation is based on a determination that the user or other entity interacting with the application 160 has performed the available gestures, inputs, clicks and the activated any UI elements in each of the logged views. That is, in one embodiment, when all UI elements have been clicked on and all views have been generated or visited, then an end condition exists. In some embodiments, traversal of views may result in an endless loop or a stall condition in which the control computer 120 cannot determine which view is the next view, or whether another view is present. For example it is possible that an app with errors may expose a view that is not linked to other views or in which UI elements do not cause a return to a prior view or a traversal to a next view. Therefore, control computer 120 may be programmed with logic to test for repeated visits to the same view; if the same view is visited more than a threshold number of times successively then an endless loop may be detected and the logic may end operation. Additionally or alternatively, the control computer 120 may be programmed to detect that no next view is possible by interacting with available UI elements and end operation at that point. This determination can be made by accessing the logs of the gestures and views of the steps 230 and 240, respectively. The logs indicate which gestures have been logged and/or which UI elements have been activated at each UI view.

4.8 Generating a Directed Graph

In 240, the interaction coverage logic 170 and/or the interaction coverage control logic generates a directed graph of the application 160. The directed graph comprises a set of vertices or nodes that are connected by edges, each edge comprising a direction from one vertex to another. In an embodiment, different vertices in the graph represent each unique UI view that was logged in steps 215 and 240 node, and edges represent a gesture that resulted in a transition from one UI view to another UI view. Each vertex is connected by at least one edge to another vertex.

Returning to the example of the banking application, the login view and the account view are each represented as vertices in the directed graph generated for that app. An edge connecting the login view to the account view represents the gesture for logging into the application. Likewise, an edge connecting the account view to the login view represents the gesture for logging out of the application. The gestures that do not result in a different view can be included in the directed graph as edges that begin and end at the same vertex.

Each directed graph may be represented in digitally stored data in the interaction data storage 140 and rendered visually or provided programmatically as a set of data to the control computer 120. The control computer 120, when obtaining the directed graph, can include a screenshot of each of the UI views as well as a fingerprint graphic or other graphic that indicates which gesture was performed to cause a transition to another UI view.

FIG. 3 depicts example of views within a specialized application in an example embodiment. FIG. 3 may serve as an example of computer devices, displays and output that may be used or result from programming the devices and the server computer to perform the steps that are otherwise described herein. FIG. 3 depicts a specialized application that has been programmed to generate at least four views denoted view A 302, view B 304, view C 306, and view D 308. Each view is navigable by a user by interacting with programmed displays and widgets that the device displays in response to programming instructions that implement the functions described herein.

View A 302 is a login view. In view A 302, when a login button 310 is clicked (labelled "click 1"), under program control, the specialized application transitions to view B 304. The view B 304 is an account view.

From view B 304, the user computer can perform one of two actions. In the first action, the user computer generates a signal resulting from a user selection or click on a webpage button 312 (labelled "click 2"). In response, the specialized application transitions from view B 304 to view C 306, which is a webpage view. From view C 306, the user computer can generate a signal resulting from a click on a back button 316 (labelled "click 3") to cause a return to view B 304.

In the second action taken from view B 304, selecting an info button 314 labelled "click 2" signals the program to provide an informational view. In response, under program control the specialized application transitions from view B 304 to view D 308, which is an informational view. From view D 308, selecting a back button 318 labelled "click 3" causes the device to return to view B 304 under program control.

FIG. 4 depicts an example of a directed graph of the specialized application in the example embodiment of FIG. 3. In an embodiment, a directed graph is created and stored in computer memory using digital data representing nodes and edges. In a directed graph 400, each view of the application is represented as a node graphically shown as a circle and each action taken in the view is represented as an edge in the form of an arrow extending from the view and ending at another view.

For example, from view A 402, an edge labelled "login" extends to view B 404, representing a transition from the login view to the account view, depicted in FIG. 3. View B 404 can transition to view C 406 or view D 408 via user selection of a website button or an info button, respectively. These transitions are represented by edges to the nodes labeled view C 406 and view D 408, respectively. From each of views C 406 and D 408, the user can select a back button to return to view B 404, as represented by the edges leading from the nodes labeled view C 406 and view D 408, respectively.

5.0 INTERACTION PROCESS OVERVIEW

Figure 5:
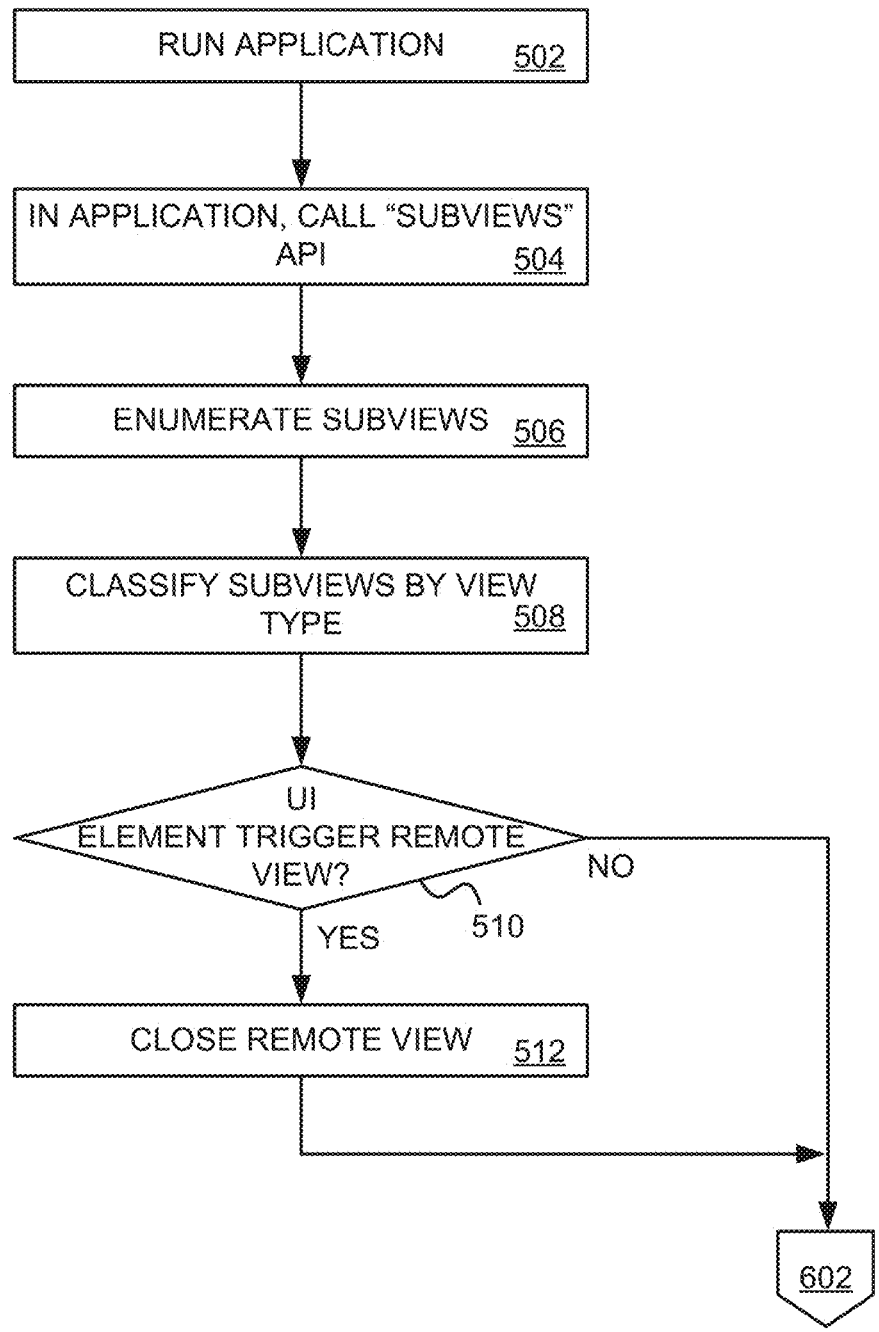
FIG. 5 illustrates a process of automatically interacting with a specialized application in an example embodiment.

FIG. 5 is a flowchart of an example process to interact with an application installed on an embedded device.

In an embodiment, the process of FIG. 5 may be performed by the automated interaction logic 165 in conjunction with the automated interaction control logic and may interoperate, for example, with application 160 of device 110. The process may be performed concurrently with the interaction coverage logic 170 such that the interaction coverage logic 170 monitors the actions and/or gestures simulated by the automated interaction logic 165. The automated interaction logic 165 performs a plurality of steps to perform as many interactions as possible that can be detected by the interaction coverage logic 170. The automated interaction logic 165 enumerates all subviews for a given UI view, and activates any subviews that can be activated by a click or another gesture.

5.1 Run Application

In step 502, the application 160 is run or executed by the embedded device 110. As described in connection with the interaction coverage logic 170 at step 210, the automated interaction logic 165 runs concurrently with the application 160. The automated interaction logic 165 can perform interactions by activating UI elements that are then captured and recorded by the interaction coverage logic 170.

The step 502 may include initiating a background thread that, starting at an initial screen, is then re-invoked each time a click event is simulated. Because the background thread does not interact with UI elements, the background thread invokes logic on a main thread to enumerate and classify all visible subviews starting with the key window or top level view in the screen.

5.2 Enumeration and Classification of Sub-Views

In step 504, the automated interaction coverage logic 165 invokes the "subviews" API call when a first view of the application is displayed. The subviews API call finds all subviews of the view. As part of the step 504, for each subview, the subview of the API call is performed again to identify subviews of the view, and so on, until no more subviews are found.

In step 506, the automated interaction logic 165 enumerates the subviews as they are identified via the subview API call. The enumerated subviews may each be assigned a unique identifier for later reference.

In step 508, while iterating over all the subviews in view, the automated interaction logic 165 classifies the view type of each subview. Specifically, subviews can be classified by UI elements. Example classifications can include, but are not limited to, clickable views such as buttons, tab bar items, and table views; text input fields; and remote views as further described in steps 510 and 512. For input fields found in a subview, text is programmatically typed in to the application by calling an on-screen keyboard of the embedded device 110, then programmatically simulating keypresses to type a string by calling operating system primitives or API calls that access the keyboard via an operating system of the device 110.

TABLE 1 sets forth example pseudo code that can be used to perform steps 504, 506, and 508:

TABLE 1

```
//(recursively) find all subviews
-(void)recursivelyEnumerateViews:(UIView*)view
{
    for(UIView *subview in [view subviews])
    {
    //classify views (see #3)
    //recursively enumerate subviews of subview
        [self recursivelyEnumerateViews:subview];
    }
}
```

5.3 Handling of Remote Views

In step 510, the automated interaction logic 165 checks for any remote views that are triggered in the subview. Remote views are other processes' views that the displayed transparently in the current application (for example, there is a 'compose email' view that the OS provides to allow apps to display an inline email client view, with a 'send msg' buttons).

In step 512, the automated interaction logic 165 handles the remote view. Since the remote view is presented by another process, the automated interaction logic 165 cannot interact with it directly. The automated interaction logic 165 can infer the presence of the remote view and can and sends button clicks to close the remote view (for example, by clicking the 'Cancel Msg' button to close the view).

Figure 6:
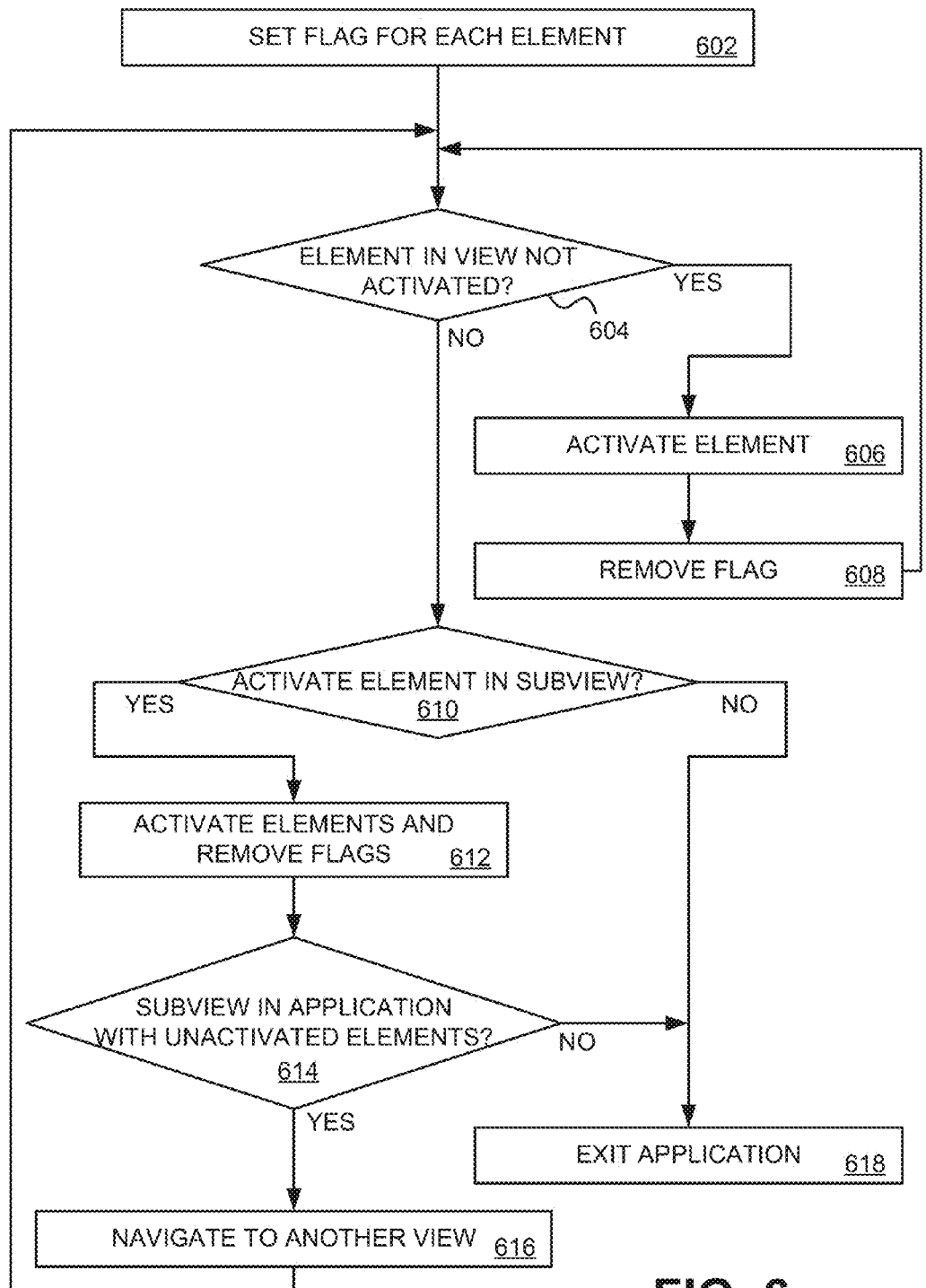
FIG. 6 illustrates a process of automatically interacting with the specialized application in an example embodiment.

If there are no remote views (step 510), or the remote view is closed (step 512), the interactive logic proceeds to step 602 of FIG. 6.

5.4 Activation of UI Elements

FIG. 6 illustrates a process for automatically interacting with the specialized application in an example embodiment. The automated interacting logic 165 is configured to, upon having the views and subviews enumerated and classified, to interact to the UI elements in the views and subviews. Concurrently with the automated interaction logic 165 interacting with the application 160, the interaction coverage logic 170 monitors and logs the gestures and responses occurring in the application 160. The automated interaction logic 165 adds new views having at least one UI element to a global list. Sub views may be uniquely identified by hashing the title of the screen and/or counting the number of unique subviews.

In an operation 602, a flag is set for each UI element in a current view of the application. The flag can be set and stored in a metadata file of the view. A flag that is set indicates that the UI element has not yet been activated by the automated interaction logic 165. Consequently, no gesture associated with the UI element is logged and no response to the UI element being selected by the application 160 is logged. Flags can be set for clickable elements and for gestures that are not associated with a visible button. The gesture flags can be set based on gesture recognizers in the application 160 that are associated with the view.

5.4.1 Selection of a Presented UI Element

In step 604, the control computer determines a first input element is currently presented on a display coupled to the first device has not yet been activated by the automated interaction logic 165. For example, automated interaction control logic 180 may instruct automated interaction logic 165 to select one or more UI input elements that are currently presented on a display coupled to embedded device 110.

Automated interaction logic 165 may select a first UI element and determine whether the first UI element is a particular type of UI input element based on a name, property, method, and/or any other data and/or data structure associated with the corresponding object. For purposes of illustrating a clear example, assume application 160 supports a gesture by virtue of having a gesture recognizer associated with the view. Automated interaction logic 165 may make a call to an introspective method that indicates whether a first object, which corresponds to the first UI element, supports the particular input method that programmatically populates the UI element and/or the state of the object with text. The introspective method may return a value that indicates whether the object supports the particular input method. If the returned value indicates the first object does not support the particular input method, then automated interaction logic 165 may move on to a second object that corresponds with a second UI element in the hierarchy, and so on, until automated interaction logic 165 finds an object that corresponds with a particular type of UI input element.

Additionally or alternatively, automated interaction logic 165 may continue to make introspective calls until automated interaction logic 165 determines what type of UI element the first object corresponds to. For example, if the first returned value indicates that the first object does not support a first particular input method, then automated interaction logic 165 may call an introspective method that indicates whether the first object supports a second, different input method that programmatically simulates a different user interaction, such as pressing a button.

Automated interaction logic 165 may send automated interaction control logic 180 a representation of a hierarchy, and/or a subset of the hierarchy, of objects and/or identifiers that identify each object and/or the type of input each object corresponds to. For purposes of illustrating a clear example, assume that automated interaction logic 165 determined that two objects correspond to UI input elements currently displayed on a display coupled to embedded device 110. The two objects are child objects to a parent object, which corresponds to a parent UI element of the two UI input elements. The first object corresponds to a first UI input element that is a text field. The second object corresponds to a second UI input element that is a button. Automated interaction logic 165 may send data to automated interaction control logic 180 defining three identifiers: the first identifier may identify the first object, the second identifier may identify the second object, and the third identifier may identify the parent object to the first object and the second object. The parent UI element may, but need not, be currently displayed on a display coupled to embedded device 110.

5.4.2 Simulation of User Inputs

In step 606, the control computer enters one or more values in one or more UI input elements. For example, automated interaction control logic 180 may send automated interaction logic 165 data indicating a particular value to be entered into the first UI element, which is a text field in this example, and that the second UI element, which in this example is a button, should be selected shortly thereafter. In response, automated interaction logic 165 may enter the particular value in the first UI element via a first input method that programmatically populates the first object and/or the first UI element with the text. Automated interaction logic 165 may select the second UI element via the input method that programmatically activates the second UI element as if the second UI element was selected by a user.

In step 608, the flag set in step 602 for the UI input elements that were activated in step 606 are removed from the metadata. The flag, by being removed, thus indicates that the UI element has been activated and need not be activated again. After step 608, the method returns to step 604.

5.4.3 Automated Interaction with Subviews

In step 610, the automated interaction logic 165 and/or the automated interaction control logic 180 determines whether to activate an item in a subview of the view of step 604 based, for example, on one or more flags set for UI elements in the subview. The subview can be accessed by activating (or re-activating a previously activated and logged) UI element in the view. In some embodiments, flags are set for the UI elements in the sub-view in the step 602 or upon navigation to the subview in step 610.

If there are no UI elements that can be activated in the subview, the automated interaction logic 165 is not able to navigate to any other views or subviews. In this instance, in step 618, the automated interaction logic 165 exits the application 160.

In step 612, as described in step 606 and 608, the UI elements in the subview are activated so that the gestures and the response to the gesture of the application 160 can be logged by the interaction coverage logic 170. In short, steps 610 and 612 are performed for each subview that hasn't been activated in the current screen, or that has unactivated subviews. The automated interaction logic 165 maintains a list of all further subviews that can be accessed via a particular subview. For example, if clicking a button in a subview causes the application 160 to transition to a new subview that has various clickable subviews, these are all saved as children of the subview.

In step 614, a determination is made as to whether any views or subviews in the application 160 have unactivated elements. If the automated interaction logic 165 has activated the elements in the view or subview, but somewhere else in the application 160 there are un-activated elements that the automated interaction logic 165 has flagged but not yet activated, the automated interaction logic 165 activates an element, in step 616, to navigate to another view (for example, a parent view), to ultimately access a view or subview having unactivated elements. The method then returns to step 604.

In step 618, if the determination of step 614 is that there are no remaining unactivated elements or subviews in the application 160, the automated interaction logic 165 exits the application 160.

In the examples discussed herein, a control computer tested a specialized application on an embedded device. However, the control computer may perform one or more of the methods discussed above on one or more other embedded devices, such as embedded device 120.

6.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
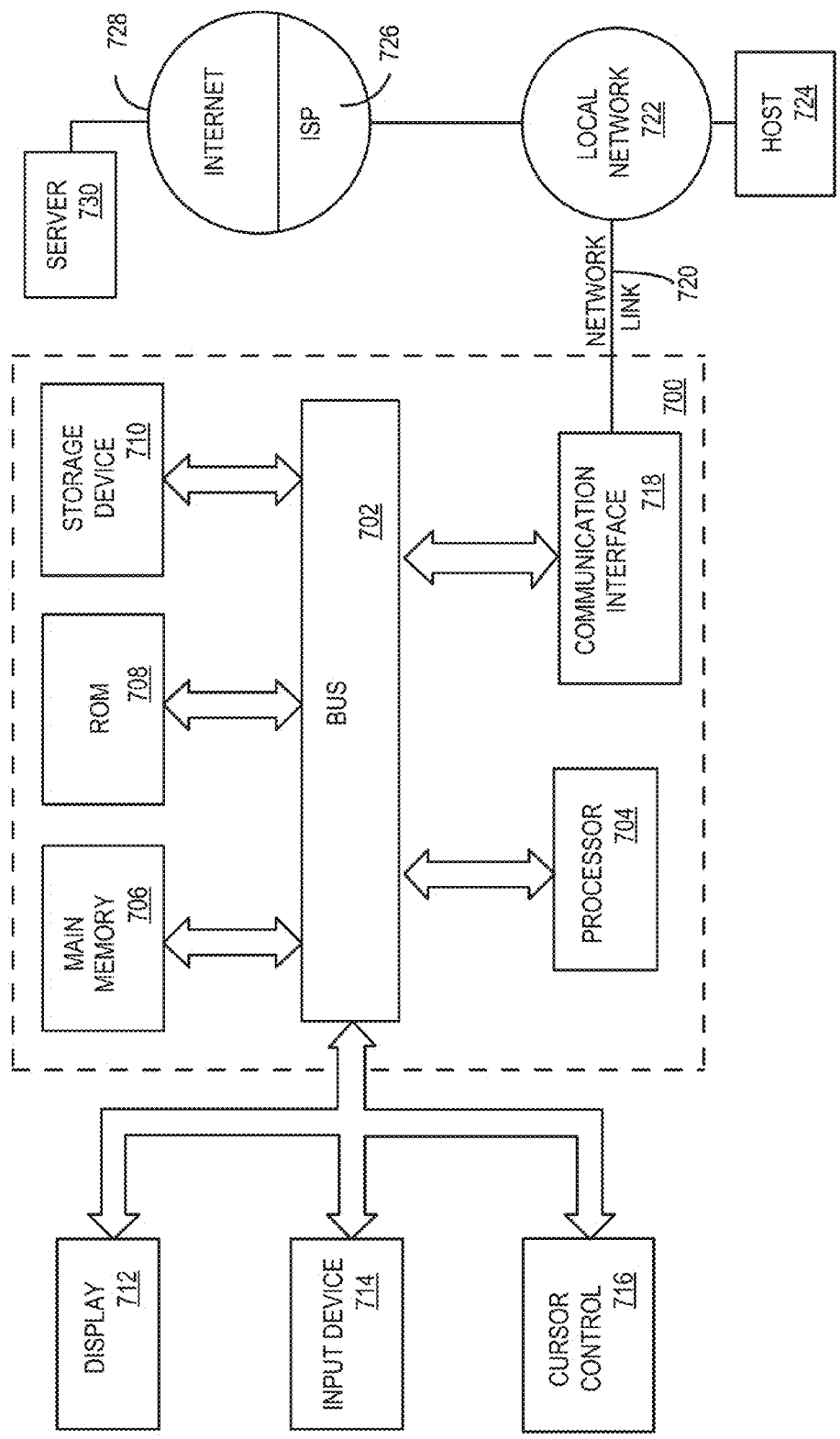
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (for example, x) and a second axis (for example, y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing system comprising:
  one or more processors;
  one or more non-transitory computer-readable media storing instructions stored which, when executed, cause the one or more processors to perform:
  establishing a monitoring connection to an embedded device over a network and causing the embedded device to concurrently execute a gesture recognizer and an executable application having a plurality of views;
  using the gesture recognizer executed by the embedded device, detecting a first gesture in a first view of the plurality of views that has been received via a touchscreen interface of the embedded device;
  using the embedded device, creating and storing a log record that identifies the first gesture in the first view and a first action that was performed by the application in response to the first gesture;
  using the embedded device, determining that the first action caused the application to provide a second view of the plurality of views;
  using the embedded device, creating and storing a second log record that identifies the second view of the plurality of views;
  using the gesture recognizer executed by the embedded device, detecting a second gesture in the second view of the plurality of views that was received via the touchscreen interface of the embedded device;
  using the embedded device, logging the second gesture in the second view and a second action performed by the application in response to the second gesture;
  using the embedded device, generating a directed graph representing an execution flow of the application, wherein the directed graph comprises: nodes representing the first view, the first gesture, the second view, and the second gesture; and edges representing that the first gesture in the first view causes the application to transition from the first view to the second view.

2. The system of claim 1, further comprising instructions which when executed cause the one or more processors to perform:
  using the embedded device, determining that the second action performed by the application in response to the second gesture causes the application to provide a third view of the plurality of views;
  using the embedded device, creating and storing a third log record that identifies the third view of the plurality of views;
  updating the directed graph by creating an edge indicating that the second gesture in the second view causes to application to transition from the second view to the third view.

3. The system of claim 1, further comprising instructions which when executed cause the one or more processors to perform:
  using the gesture recognizer executed by the embedded device, detecting the first gesture in the second view of the plurality of views received via the touchscreen interface of the embedded device;
  using the embedded device, logging the first gesture in the second view and a third action performed by the application in response to the first gesture in second view;
  wherein the first action and the second action are a same action.

4. The system of claim 1, further comprising instructions which when executed cause the one or more processors to perform:
  using the gesture recognizer executed by the embedded device, detecting the first gesture in the second view of the plurality of views received via the touchscreen interface of the embedded device;
  using the embedded device, logging the first gesture in the second view and a third action performed by the application in response to the first gesture in second view;
  wherein the first action and the second action are different actions.

5. The system of claim 1, further comprising instructions which when executed cause the one or more processors to perform, using the embedded device, determining that the second action performed by the application in response to the second gesture in the second view causes the application to provide the first view of the plurality of views.

6. The system of claim 1, wherein the first gesture is a touch at a first location in the first view, wherein the first location is defined by x, y coordinates of the first view.

7. The system of claim 1, wherein the second gesture comprises a plurality of touches associated with entering text in a text field.

8. The system of claim 1 wherein the first gesture is a complex gesture that is defined by a dataset comprising values for beginning x-y coordinate(s), ending x-y coordinate(s), a number of intermediate x-y coordinates, and one or more timestamps associated with the x-y coordinates.

9. The system of claim 1, wherein the second view comprises at least a portion of the first view.

10. The system of claim 1, wherein determining that the first action performed by the application in response to the first gesture causes the application to provide the second view of the plurality of views is based on determining that a title of the first view is different than a title of the second view.

11. The system of claim 1, wherein determining that the first action performed by the application in response to the first gesture causes the application to provide the second view of the plurality of views is based on determining that a first number of elements in the first view is different than a second number of elements in the second view.

12. The system of claim 1, wherein the first gesture is automatically simulated.

13. A data processing method comprising:
establishing a monitoring connection to an embedded device over a network and causing the embedded device to concurrently execute a gesture recognizer and an executable application having a plurality of views;
using the gesture recognizer executed by the embedded device, detecting a first gesture in a first view of the plurality of views that has been received via a touchscreen interface of the embedded device;
using the embedded device, creating and storing a log record that identifies the first gesture in the first view and a first action that was performed by the application in response to the first gesture;
using the embedded device, determining that the first action caused the application to provide a second view of the plurality of views;
using the embedded device, creating and storing a second log record that identifies the second view of the plurality of views;
using the gesture recognizer executed by the embedded device, detecting a second gesture in the second view of the plurality of views that was received via the touchscreen interface of the embedded device;
using the embedded device, logging the second gesture in the second view and a second action performed by the application in response to the second gesture;
using the embedded device, generating a directed graph representing an execution flow of the application, wherein the directed graph comprises: nodes representing the first view, the first gesture, the second view, and the second gesture; and edges representing that the first gesture in the first view causes the application to transition from the first view to the second view.

14. The method of claim 13, further comprising:
using the embedded device, determining that the second action performed by the application in response to the second gesture causes the application to provide a third view of the plurality of views;
using the embedded device, creating and storing a third log record that identifies the third view of the plurality of views;
updating the directed graph by creating an edge indicating that the second gesture in the second view causes to application to transition from the second view to the third view.

15. The method of claim 13, further comprising:
using the gesture recognizer executed by the embedded device, detecting the first gesture in the second view of the plurality of views received via the touchscreen interface of the embedded device;
using the embedded device, logging the first gesture in the second view and a third action performed by the application in response to the first gesture in second view;
wherein the first action and the second action are a same action.

16. The method of claim 13, further comprising:
using the gesture recognizer executed by the embedded device, detecting the first gesture in the second view of the plurality of views received via the touchscreen interface of the embedded device;
using the embedded device, logging the first gesture in the second view and a third action performed by the application in response to the first gesture in second view;
wherein the first action and the second action are different actions.

17. The method of claim 13, further comprising, using the embedded device, determining that the second action performed by the application in response to the second gesture in the second view causes the application to provide the first view of the plurality of views.

18. The method of claim 13, wherein the first gesture is a touch at a first location in the first view, wherein the first location is defined by x, y coordinates of the first view.

19. The method of claim 13, wherein determining that the first action performed by the application in response to the first gesture causes the application to provide the second view of the plurality of views is based on determining that a title of the first view is different than a title of the second view.

20. The method of claim 13, wherein determining that the first action performed by the application in response to the first gesture causes the application to provide the second view of the plurality of views is based on determining that a first number of elements in the first view is different than a second number of elements in the second view.

* * * * *